United States Patent
Gunder (10) Patent No.: US 10,011,025 B2
(45) Date of Patent: Jul. 3, 2018

(54) ARTICULATING GRIPPER TOOLING

(71) Applicant: PHD, Inc., Fort Wayne, IN (US)

(72) Inventor: Tod A. Gunder, New Haven, IN (US)

(73) Assignee: PHD, Inc., Fort Wayne, IN (US)

( * ) Notice: Subject to any disclaimer, the term of this patent is extended or adjusted under 35 U.S.C. 154(b) by 231 days.

(21) Appl. No.: 15/178,599

(22) Filed: Jun. 10, 2016

(65) Prior Publication Data

US 2016/0361823 A1    Dec. 15, 2016

Related U.S. Application Data (60) Provisional application No. 62/173,707, filed on Jun. 10, 2015.

(51) Int. Cl.
*B66C 1/00* (2006.01)
*B25J 15/04* (2006.01)

(52) U.S. Cl.
CPC ................. *B25J 15/0475* (2013.01)

(58) Field of Classification Search
CPC ...... B25J 15/0475; B25J 15/045; B25J 15/04; B25J 15/0408; B25J 15/0028; B25J 15/08
USPC ........... 294/106; 901/39; 269/279, 263, 275, 269/281
See application file for complete search history.

(56) References Cited

U.S. PATENT DOCUMENTS

| | | | | |
|---|---|---|---|---|
| 1,938,485 A | * | 12/1933 | Cossor | B66C 1/54 294/106 |
| 3,575,405 A | * | 4/1971 | Harding | B25B 5/106 269/211 |
| 3,807,786 A | * | 4/1974 | Alegria | B66C 1/58 294/104 |
| 3,879,078 A | * | 4/1975 | Turner | B66C 1/64 294/101 |
| 4,545,722 A | | 10/1985 | Cutkosky et al. | |
| 4,697,839 A | | 10/1987 | Fischer | |
| 6,056,281 A | * | 5/2000 | Moilanen | B25B 5/087 269/237 |
| 6,079,896 A | * | 6/2000 | Dellach | B25B 5/087 269/32 |
| 6,089,631 A | * | 7/2000 | Thurlow | A47J 43/283 294/106 |
| 6,276,733 B1 | * | 8/2001 | Moilanen | B25J 15/0475 294/116 |
| 6,530,616 B1 | * | 3/2003 | McIntosh | B25B 5/087 294/106 |
| 7,344,171 B1 | * | 3/2008 | McMullan | B25B 7/12 294/111 |

(Continued)

FOREIGN PATENT DOCUMENTS

| | | | | |
|---|---|---|---|---|
| DE | 3731471 A1 | * | 4/1989 | .......... B25J 15/0206 |
| GB | 825553 A | * | 12/1959 | .............. B25J 15/04 |

*Primary Examiner* — Gabriela M Puig (74) *Attorney, Agent, or Firm* — Taylor IP, P.C.

(57) ABSTRACT

Articulating gripper tooling for gripping an object, the articulating gripper tooling comprising: an articulating finger jaw including a slot; a gripping element including a shaft and at least one finger attached to the shaft, the shaft having a longitudinal axis; and a locking pin disposed through the slot and coupling the shaft to the articulating finger jaw; wherein the gripping element is free to rotate a predetermined amount about the longitudinal axis of the shaft, limited by the locking pin contacting a surface of the articulating finger jaw and/or an adjustment element.

20 Claims, 6 Drawing Sheets

(56) References Cited

U.S. PATENT DOCUMENTS

| | | | |
|---|---|---|---|
| 7,661,739 B2 * | 2/2010 | Burgmeier | B67C 3/242 |
| | | | 294/106 |
| 7,845,698 B2 * | 12/2010 | Jenkins | B25J 9/1005 |
| | | | 294/115 |
| 7,854,456 B2 * | 12/2010 | Waldorf | B25J 15/0226 |
| | | | 294/116 |
| 8,191,947 B2 | 6/2012 | Jouan De Kervanoael | |
| 8,240,729 B2 | 8/2012 | Vittor | |
| 8,474,893 B2 | 7/2013 | Kawanami et al. | |
| 9,067,324 B2 | 6/2015 | Matsuoka | |
| 2001/0015563 A1 * | 8/2001 | Moilanen | B25B 5/087 |
| | | | 294/203 |
| 2002/0093211 A1 * | 7/2002 | Filipiak | B25B 5/087 |
| | | | 294/203 |
| 2003/0116985 A1 * | 6/2003 | Moilanen | B25B 5/087 |
| | | | 294/207 |
| 2003/0197389 A1 * | 10/2003 | Moilanen | B25B 5/087 |
| | | | 294/203 |
| 2017/0232620 A1 * | 8/2017 | Kalb | B25J 17/02 |
| | | | 279/2.09 |

* cited by examiner

ARTICULATING GRIPPER TOOLING

CROSS REFERENCE TO RELATED APPLICATIONS

This is a non-provisional application based upon U.S. provisional patent application Ser. No. 62/173,707, entitled "ARTICULATING GRIPPER TOOLING", filed Jun. 10, 2015, which is incorporated herein by reference.

BACKGROUND OF THE INVENTION

1. Field of the Invention

The present invention relates to mechanical grippers, and, more particularly, to the jaw tooling for such grippers.

2. Description of the Related Art

Grippers are mechanical devices with one or more jaws that are moved toward and away from one another by an electric motor, fluid powered piston, or other motion. In many cases, tooling attached to the jaws of the gripper is responsible for transferring the force of the gripper to a workpiece such that the workpiece may then be held, moved, or rotated. This tooling may need to be able to grasp workpieces that differ from one another in size, shape, draft, material, mass, and more.

Typically, gripper jaw tooling is designed to match the contour of the workpiece; in this way, the tooling will mate with the workpiece when the gripper applies force to grasp the piece resulting in maximized force transmission to the part. Designing and manufacturing tooling to match workpieces of differing size, shape, draft, material, mass, etc. can prove not only costly, but far less effective at maximizing the grip force applied to the workpiece.

What is needed in the art is a gripper tooling assembly that can be used with maximum efficiency on workpieces of differing size, shape, draft, material, mass, etc.

SUMMARY OF THE INVENTION

The present invention provides an improved gripper jaw tooling incorporating features with minimal increase in size or complexity that allow the tooling to adapt to workpieces that differ from one another in size, shape, draft, material, mass, and more.

The present invention also provides gripper jaw tooling that articulates or pivots as it makes contact with the workpiece. This allows the tooling to mate with the shape or draft of the surfaces of the workpiece that the gripper jaw tooling is acting upon.

The present invention in one form is directed to gripper jaw tooling with articulating limits determined by the configuration of the mounting block or articulating finger jaw. The articulating section of the gripper jaw tooling (or finger) concludes with a shaft. The articulating section pivots about the longitudinal axis of the shaft within the mounting block or articulating finger jaw. The mounting block includes details for rotational limiting and provisions for attachment to the jaws of the gripper.

The present invention in another form is directed to gripper jaw tooling with adjustable articulation angle limits in the mounting block or articulating finger jaw to fine tune the limits as needs change. The articulating section of the gripper jaw tooling (or finger) concludes with a shaft. The articulating section pivots about the longitudinal axis of the shaft within the mounting block or articulating finger jaw. The mounting block includes adjustment members for rotational limiting and provisions for attachment to the jaws of the gripper.

The present invention in any form provides an optional quick-change feature for ease of maintenance. This feature allows the wear items of the tooling system to be easily detached from one another for cleaning, repair, or replacement.

An advantage of the present invention is the ability for the gripper jaw tooling to adapt to workpieces of differing size, shape, draft, material, mass, etc., thereby obviating the need for custom gripper jaw tooling to complement varying workpieces.

Another advantage of the present invention is the articulating section of the gripper jaw tooling can be constrained a predetermined amount, thereby providing a secure attachment of the workpiece.

Yet another advantage of the present invention is the articulating section of the gripper jaw tooling can be constrained a predetermined amount by adjusting one or more adjustment members in the mounting block or articulating finger jaw, thereby varying the articulation amount and providing a secure attachment of the workpiece.

Still another advantage of the present invention is the capability to easily disassemble the gripper jaw tooling in order to easily repair, replace, or clean the various components thereof.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
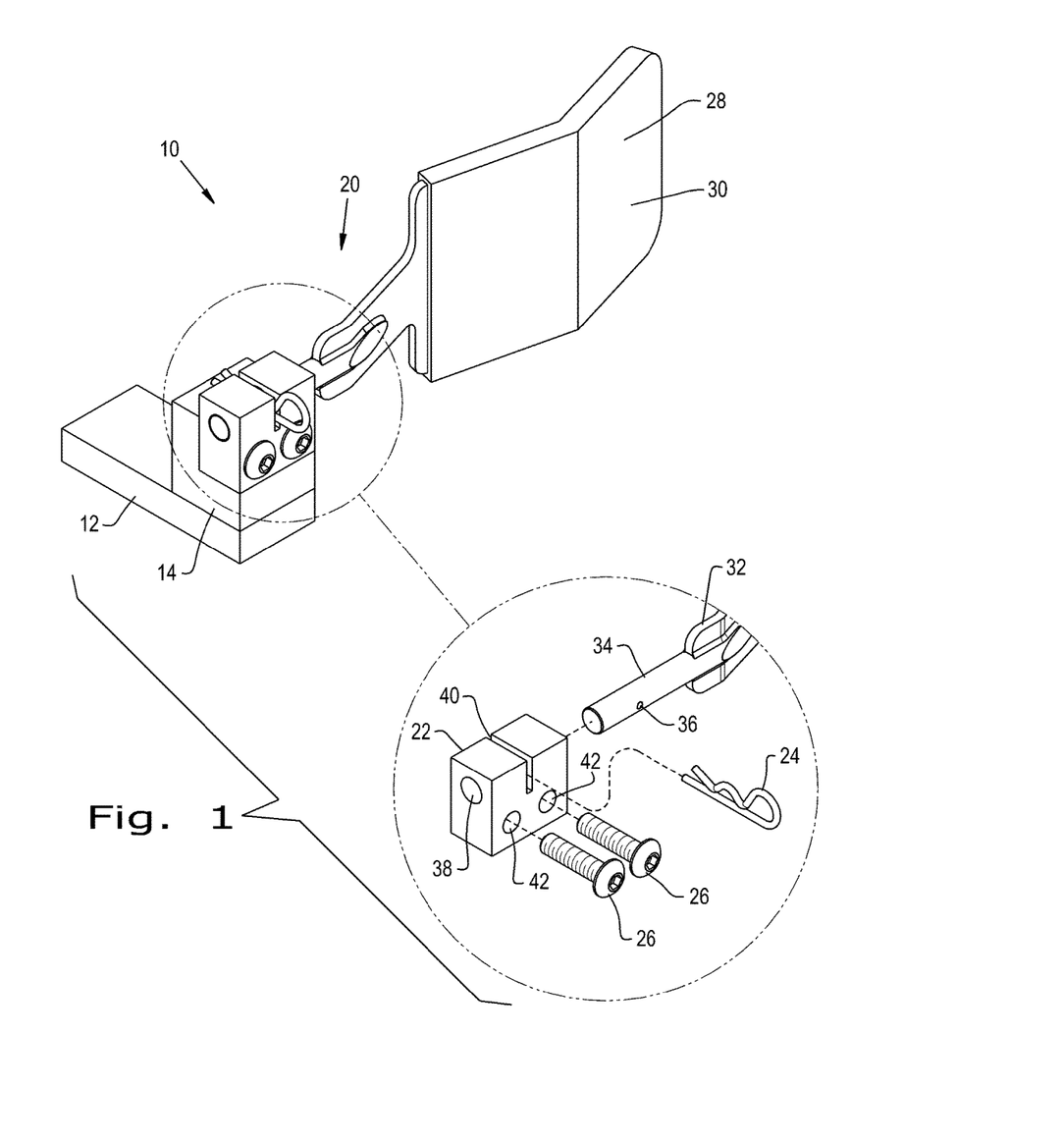
FIG. 1 is an isometric view and exploded view detail of an embodiment of gripper jaw tooling of the present invention.

Referring now to FIG. 1, there is shown an embodiment of a gripping device 10 according to the present invention. Gripping device 10 includes main body 12, gripper jaw 14, and articulating gripper tooling assembly 20. Although not illustrated, gripping device 10 includes at least one additional gripper jaw 14 and articulating gripper tooling assembly 20 in order to provide a way of gripping a workpiece.

Articulating gripper tooling assembly 20 includes mounting block 22, locking pin 24, mounting block attachment members 26, and gripping element 28. Gripping element 28 includes finger 30, finger extension 32, and finger shaft 34 with through-hole 36. Mounting block 22 includes through-hole 38, slot 40, and attachment member through-holes 42.

Gripping element 28 is rotatably attached to mounting block 22 by inserting finger shaft 34 into through-hole 38, and securing with locking pin 24 inside slot 40 and through finger shaft through-hole 36. Locking pin 24 may be a quick-release pin. Mounting block 22, with or without gripping element 28 rotatably attached, is attached to jaw 14 by attachment members 26 and through-holes 46.

Figure 2:
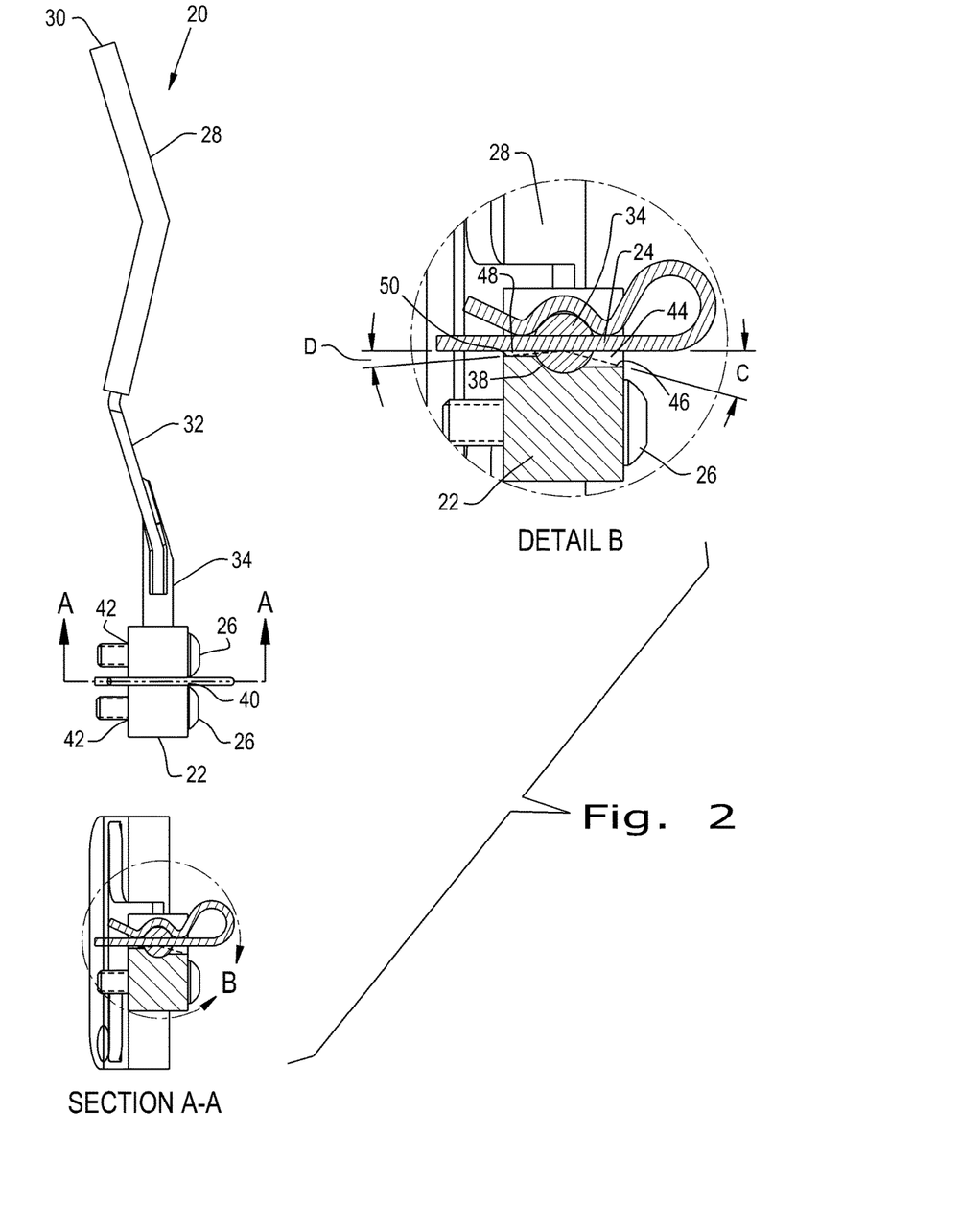
FIG. 2 is a top view of the gripper jaw tooling of FIG. 1.

Now referring to FIG. 2 with continued referral to FIG. 1, the operation of articulating gripper tooling assembly 20 is described. Section A-A illustrates the bi-directional rotational direction ("articulation") of gripping element 28 with respect to mounting block 22. The bi-directional rotation is limited as shown in Detail B. Mounting block 22 includes at least two reliefs 44 and 48 with resulting respective relief shelves 46 and 50 at the bottom of slot 40. When attached to mounting block 22 by locking pin 24, gripping element 28 is free to rotate in a clockwise direction until locking pin 24 contacts relief shelf 46, thereby preventing additional clockwise rotation. Similarly, gripping element 28 is free to rotate in a counterclockwise direction until locking pin 24 contacts relief shelf 50, thereby preventing additional counterclockwise rotation.

In one embodiment, the articulating angle C of gripping element 28 with respect to mounting block 22 is limited to 15 degrees in the clockwise direction, and the articulating angle D of gripping element 28 with respect to mounting block 22 is limited to 5 degrees in the counterclockwise direction as viewed in Detail B.

The vertical distance from the longitudinal axis of through-hole 38 to either the outer edge of relief surface 46 or the outer edge of relief surface 50 alters the rotating (articulating) angle in the respective direction of rotation. More specifically, increasing the vertical distance from the longitudinal axis of through-hole 38 to either the outer edge of relief shelf 46 or the outer edge of relief shelf 50 will increase the angle that the gripping element 28 will be free to articulate. Likewise, decreasing the vertical distance from the longitudinal axis of through-hole 38 to either the outer edge of relief shelf 46 or the outer edge of relief shelf 50 will decrease the angle that the gripping element 28 will be free to articulate.

Figure 2A:
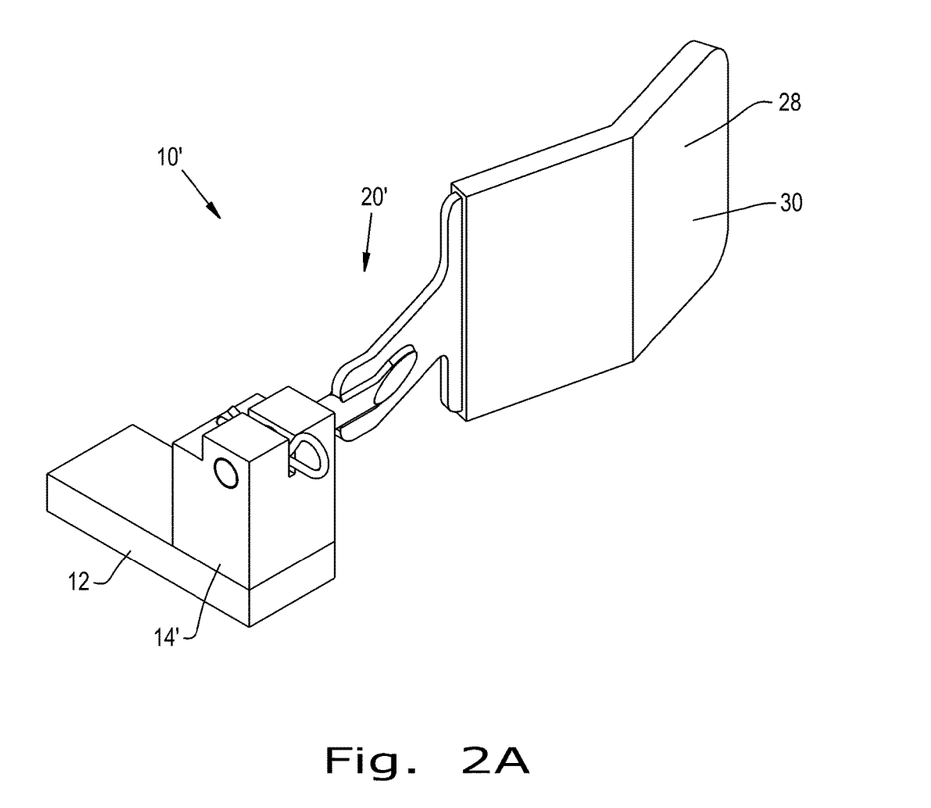
FIG. 2A is an isometric view of an alternate embodiment of the gripper jaw tooling of FIG. 1.

Referring now to FIG. 2A, an alternative embodiment gripper device 10' is shown with gripper tool assembly 20'. The only difference between 10' and 10 is that gripper tooling assembly 20' does not include a separate mounting block 22 with attachment members 26 or through-holes 42; gripping element 28 is rotatably coupled directly to articulating finger jaw 14'. All other features are the same.

Figure 3:
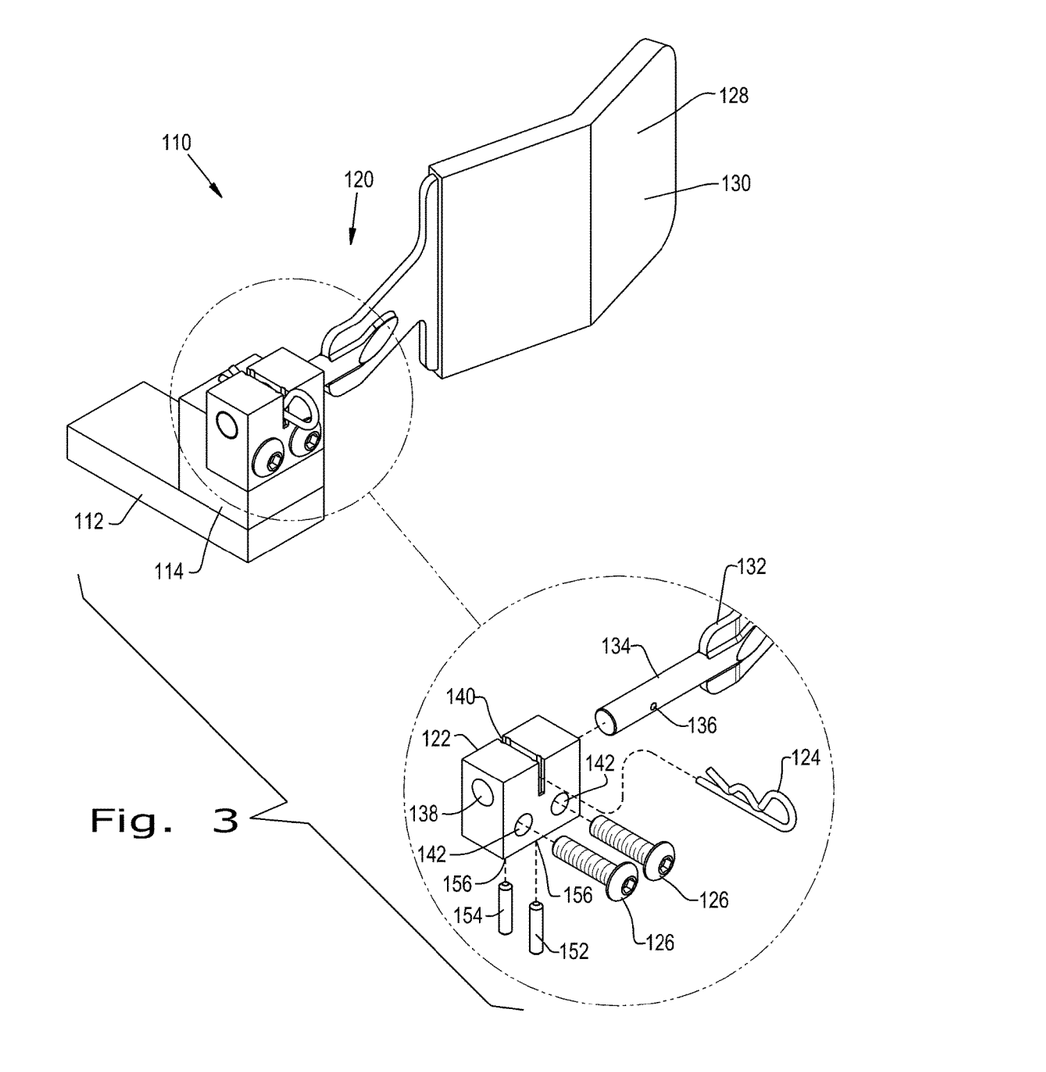
FIG. 3 is an isometric view and exploded view detail of an alternate embodiment of gripper jaw tooling of the present invention.

Referring now to FIG. 3, there is shown an alternate embodiment of a gripping device 110 according to the present invention. Gripping device 110 includes main body 112, gripper jaw 114, and articulating gripper tooling assembly 120. Although not illustrated, gripping device 110 includes at least one additional gripper jaw 114 and articulating gripper tooling assembly 120 in order to provide a way of gripping a workpiece.

Articulating gripper tooling assembly 120 includes mounting block 122, locking pin 124, mounting block attachment members 126, and gripping element 128. Gripping element 128 includes finger 130, finger extension 132, and finger shaft 134 with through-hole 136. Mounting block 122 includes through-hole 138, slot 140, attachment member through-holes 142, and adjustment member through-holes 156.

Gripping element 128 is rotatably attached to mounting block 122 by inserting finger shaft 134 into through-hole 138, and securing with locking pin 124 inside slot 140 and through finger shaft through-hole 136. Locking pin 124 may be a quick-release pin. Mounting block 122, with or without gripping element 128 rotatably attached, is attached to jaw 114 by attachment members 126 and through-holes 146.

Figure 4:
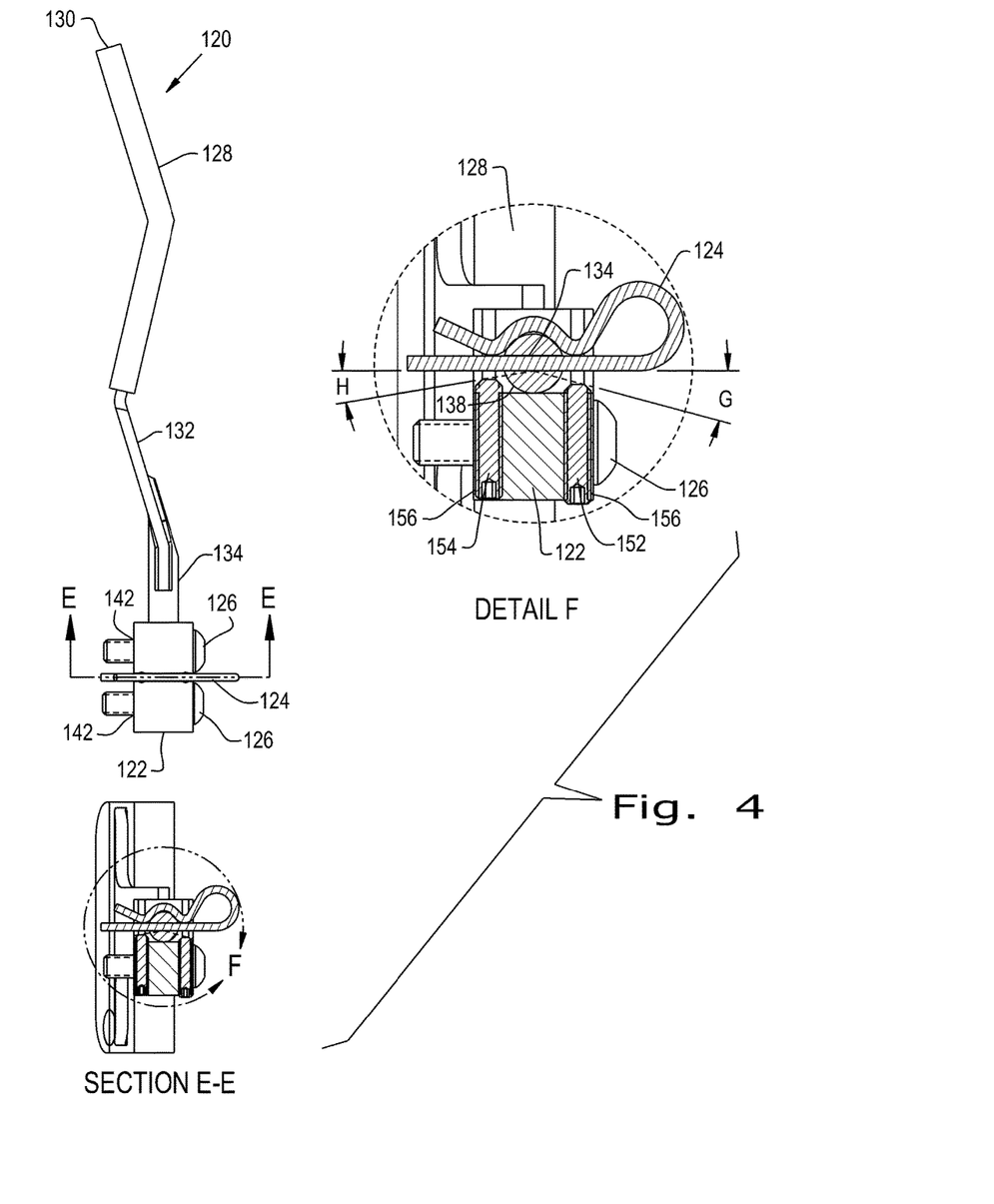
FIG. 4 is a top view of the gripper jaw tooling of FIG. 3.

Now referring to FIG. 4 with continued referral to FIG. 3, the operation of articulating gripper tooling assembly 120 is described. Section E-E illustrates the bi-directional rotational direction ("articulation") of gripping element 128 with respect to mounting block 122. The bi-directional rotation is limited as shown in Detail F. As previously noted, mounting block 122 includes adjustment member through-holes 156, which may be threaded. First limit adjustment member 152 and second limit adjustment member 154, which may also be threaded, are inserted into adjustment member through-holes 156. When attached to mounting block 122 by locking pin 124, gripping element 128 is free to rotate in a clockwise direction until locking pin 124 contacts first limit adjustment member 152, thereby preventing additional clockwise rotation. Similarly, gripping element 128 is free to rotate in a counterclockwise direction until locking pin 124 contacts second limit adjustment member 154, thereby preventing additional counterclockwise rotation.

In one embodiment, the articulating angle G of gripping element 128 with respect to mounting block 122 is limited to 15 degrees in the clockwise direction, and the articulating angle H of gripping element 128 with respect to mounting block 122 is limited to 10 degrees in the counterclockwise direction as viewed in Detail F.

The vertical distance from the longitudinal axis of through-hole 138 to either the end of first limit adjustment member 152 or the end of second limit adjustment member 154 alters the rotating (articulating) angle in the respective direction of rotation. More specifically, increasing the vertical distance from the longitudinal axis of through-hole 138 to either the end of first limit adjustment member 152 or the end of second limit adjustment member 154 will increase the angle that the gripping element 128 will be free to articulate. Likewise, decreasing the vertical distance from the longitudinal axis of through-hole 138 to either the end of first limit adjustment member 152 or the end of second limit adjustment member 154 will decrease the angle that the gripping element 128 will be free to articulate.

Figure 4A:
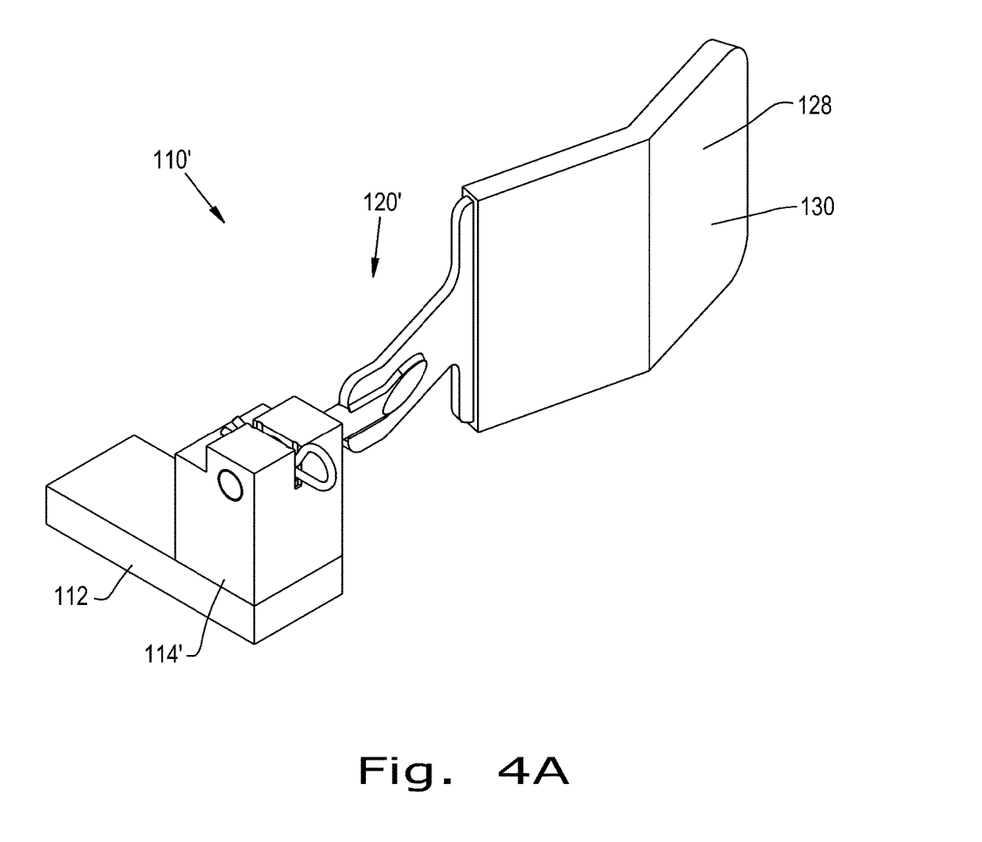
FIG. 4A is an isometric view of an alternate embodiment of the gripper jaw tooling of FIG. 3.

Referring now to FIG. 4A, an alternative embodiment gripper device 110' is shown with gripper tool assembly 120'. The only difference between 110' and 110 is that gripper tooling assembly 120' does not include a separate mounting block 122 with attachment members 126 or through-holes 142; gripping element 128 is rotatably coupled directly to articulating finger jaw 114'. All other features are the same.

While articulating gripper tooling has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A device for gripping an object, comprising:
a main body;
at least one jaw coupled to the main body; and
a gripper tooling assembly attached to the at least one jaw with at least one fastener, the gripper tooling assembly including:
a mounting block attached to the at least one jaw, the mounting block including a slot;
a gripping element including a shaft and at least one finger attached to the shaft, the shaft having a longitudinal axis; and
a locking pin disposed through the slot and coupling the shaft to the mounting block, the gripping element being free to rotate a predetermined amount about the longitudinal axis of the shaft.

2. The device of claim 1, wherein the locking pin is a detachable pin.

3. The device of claim 1, wherein the slot includes at least one shelf.

4. The device of claim 3, wherein the predetermined amount of rotation of the gripping element is determined by the locking pin contacting the at least one shelf.

5. The device of claim 1, further comprising at least one adjustment element.

6. The device of claim 5, wherein the predetermined amount of rotation of the gripping element is determined by the locking pin contacting a surface of the at least one adjustment element.

7. The device of claim 5, wherein the at least one adjustment element is a threaded member.

8. The device of claim 7, wherein turning the at least one adjustment element clockwise decreases the predetermined amount of rotation of the gripping element, and turning the at least one adjustment element counterclockwise increases the predetermined amount of rotation of the gripping element.

9. A gripper tooling assembly, the gripper tooling assembly comprising:
an articulating finger jaw, the articulating finger jaw including a slot;
a gripping element including a shaft and at least one finger attached to the shaft, the shaft having a longitudinal axis; and
a locking pin disposed through the slot and coupling the shaft to the articulating finger jaw, the gripping element being free to rotate a predetermined amount about the longitudinal axis of the shaft.

10. The gripper tooling assembly of claim 9, wherein the locking pin is a detachable pin.

11. The gripper tooling assembly of claim 9, wherein the slot includes at least one shelf.

12. The gripper tooling assembly of claim 11, wherein the predetermined amount of rotation of the gripping element is determined by the locking pin contacting the at least one shelf.

13. The gripper tooling assembly of claim 9, further comprising at least one adjustment element.

14. The gripper tooling assembly of claim 13, wherein the predetermined amount of rotation of the gripping element is determined by the locking pin contacting a surface of the at least one adjustment element.

15. The gripper tooling assembly of claim 13, wherein the at least one adjustment element is a threaded member.

16. The gripper tooling assembly of claim 15, wherein turning the at least one adjustment element clockwise decreases the predetermined amount of rotation of the gripping element, and turning the at least one adjustment element counterclockwise increases the predetermined amount of rotation of the gripping element.

17. A method of gripping an object, the method comprising:
providing a gripper tooling assembly, the gripper tooling assembly including:
an articulating finger jaw, the articulating finger jaw including a slot;
a gripping element including a shaft and at least one finger attached to the shaft, the shaft having a longitudinal axis; and
a locking pin disposed through the slot and coupling the shaft to the articulating finger jaw, the gripping element being free to rotate a predetermined amount about the longitudinal axis of the shaft.
attaching said gripper tooling assembly to a main body of a gripping machine;
positioning said gripper tooling assembly relative to a workpiece; and
actuating the gripping machine, thereby enabling the gripper tooling assembly to secure the workpiece.

18. The method of claim 17, wherein the predetermined amount of rotation of the gripping element is determined by the locking pin contacting a surface of the articulating finger jaw.

19. The method of claim 17, wherein the gripper tooling assembly further comprises at least one adjustment element.

20. The method of claim 19, wherein the predetermined amount of rotation of the gripping element is determined by the locking pin contacting the at least one adjustment element.

* * * * *